(12) United States Patent
Muljono et al.

(10) Patent No.: US 9,335,933 B2
(45) Date of Patent: May 10, 2016

(54) EQUALIZATION FOR HIGH SPEED INPUT/OUTPUT (I/O) LINK

(71) Applicants: Harry Muljono, San Ramon, CA (US); Charlie Lin, Cupertino, CA (US); Kai Xiao, University Place, WA (US); Linda K. Sun, Fremont, CA (US)

(72) Inventors: Harry Muljono, San Ramon, CA (US); Charlie Lin, Cupertino, CA (US); Kai Xiao, University Place, WA (US); Linda K. Sun, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 14/142,619

(22) Filed: Dec. 27, 2013

(65) Prior Publication Data
US 2015/0188732 A1 Jul. 2, 2015

(51) Int. Cl.
*H03H 7/30* (2006.01)
*G06F 3/06* (2006.01)
*H04L 25/03* (2006.01)

(52) U.S. Cl.
CPC ............ *G06F 3/061* (2013.01); *H04L 25/0305* (2013.01); *H04L 25/03038* (2013.01)

(58) Field of Classification Search
CPC ................... H04L 25/03057; H04L 25/03006; H04L 27/01; H04L 25/0305; H04L 25/03038; G06F 3/061
USPC .................................. 375/232, 229, 230, 233
See application file for complete search history.

(56) References Cited

U.S. PATENT DOCUMENTS

| | | | |
|---|---|---|---|
| 6,311,285 B1 * | 10/2001 | Rodriguez et al. | 713/401 |
| 2005/0152488 A1 * | 7/2005 | Buckwalter et al. | 375/350 |
| 2010/0315142 A1 * | 12/2010 | Zerbe | 327/161 |
| 2013/0230093 A1 * | 9/2013 | Aziz et al. | 375/233 |

\* cited by examiner

*Primary Examiner* — Helene Tayong
(74) *Attorney, Agent, or Firm* — Blakely, Sokoloff, Taylor & Zafman LLP

(57) ABSTRACT

Described are systems and apparatuses to mitigate the timing margin loss caused by inter-symbol interference (ISI) in high speed input/output (I/O) interfaces. Data dependent jitter (DDJ) compensation techniques that may be utilized in the transmission or receiving circuitry of the I/O interface, including capturing bit data values of a data signal prior to an identified data transition, and delaying/advancing the transmission/reception the data signal or a corresponding clock signal based on these bit data values.

20 Claims, 6 Drawing Sheets

EQUALIZATION FOR HIGH SPEED INPUT/OUTPUT (I/O) LINK

BACKGROUND

Data transferred between two devices, for example memory and a processor, or vice versa, over transmission channels (e.g., wires or transmission lines) severely degrades the received data eye (the data eye being a diagram to represent a high speed digital signal). In particular, the transmission channels may introduce moderate to severe Inter Symbol Interference (ISI) for multi-gigabit ranges.

Double data rate (DDR) memory devices transfer data on both the rising and falling edges of a clock signal. Such memory devices require strict control of the timing for the transmission and reception of electrical data and clock/strobe signals. A physical interface (PHY) is coupled between the memory controller and the memory devices, and typically includes circuitry for handling the timing requirements of the data, command, address and associated strobes. For example, the PHY may include delay circuitry configured to properly locate the clock/data strobe in the data eye.

A serial input/output (I/O) link transmits data sequentially over a physical channel. Differential design is often used in a serial I/O link for higher data rates, better performance, and/or longer reach. A serial I/O link PHY typically includes circuitry to handle the timing requirement of the data, at the both a transmitter and a receiver.

What is needed is a solution on either the receiving or transmitting end of a channel to gain additional data eye margins.

BRIEF DESCRIPTION OF THE DRAWINGS

Non-limiting and non-exhaustive embodiments of the disclosure are described with reference to the following figures, wherein like reference numerals refer to like parts throughout the various views unless otherwise specified.

DESCRIPTION OF THE EMBODIMENTS

Figure 1:
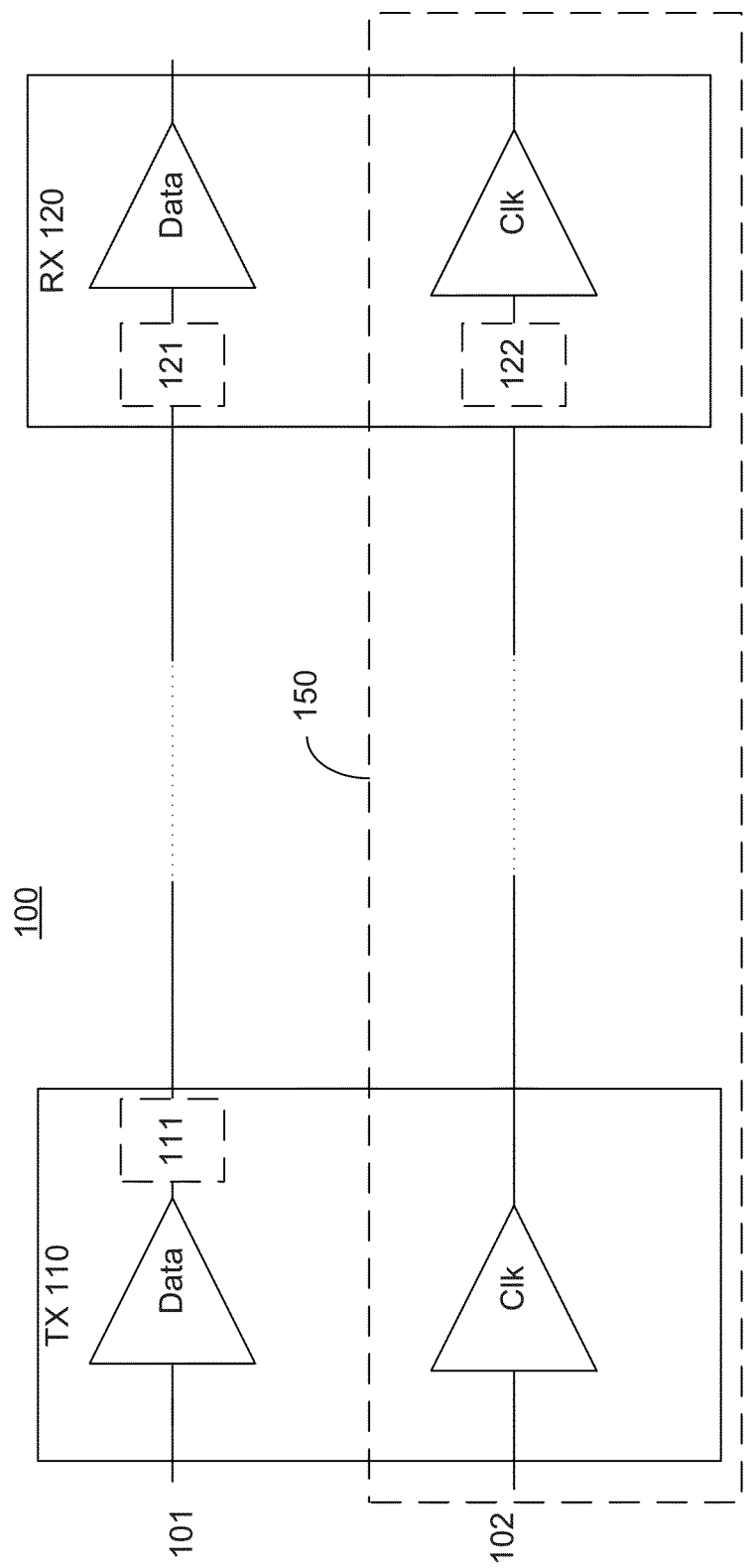
FIG. 1 illustrates a high speed input/output interface according to an embodiment of the disclosure.

Embodiments of the disclosure describe equalization for high speed input/output (I/O) links. In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors, Gate All Around Cylindrical Transistors or other devices implementing transistor functionality like carbon nanotubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

As described here, embodiments of the disclosure may be utilized in high speed I/O interfaces such as those described by double data rate (DDR) or low power DDR (LPDDR) specifications (e.g., DDR4: JEDEC Standard JESD79-4 published September 2012; LPDDR4: specification not yet published) or other I/O interfaces such as Peripheral Component Interconnect express (PCIe), Serial Attached SCSI (Small Computer Interface) (SAS), Serial Advanced Technology Attachment (SATA), Universal Serial Bus (USB), Direct Media Interface (DMI), etc. Embodiments of the disclosure may be utilized on either the receiving or transmitting end of a channel to gain additional data eye margins for any of these interfaces.

FIG. 1 illustrates a high speed I/O interface 100 according to an embodiment of the disclosure. In this embodiment, interface 100 comprises a serial or parallel I/O interface having transmission/reception (TX/RX) components 110 and 120, wherein TX 110 may include transmission adjustment circuit 111 to adjust the transmission of data signal 101, and RX 120 may include adjustments circuit 121 and/or 122 to adjust received data signal 101 and clock signal 102 respectively (embodiments may or may not utilize clock signal path 150, as described below).

TX/RX components 110 and 120 may be included in any two devices, including processors or processor cores, memory devices, platform host devices such as Peripheral Component Interconnect express (PCIe) devices, Serial Advanced Technology Attachment (SATA) devices, Serial Attached SCSI (Small Computer System Interface) (SAS) devices, Universal Serial Bus (USB) devices, etc.

In some embodiments, interface 100 may only transmit and receive data signal 101 (or a plurality of signals for parallel I/O interfaces), and TX/RX components 110 and 120 do not include clock/strobe signal path 150; in other embodiments, both data and clock signals are transmitted/received. In embodiments wherein said interface is consistent with any known DDR specification, two bits of data are transmitted on data bus signal 101 during each cycle of clock signal 102. These two bits are referred to herein as "even" and "odd" data bits. Double data rate transmission may be accomplished in many ways; for example, a single internal clock may be used to set the duration of data transmission on the bus for both the odd and even data bits—such as odd data being referenced to the low state of the internal clock and even data being referenced to the high state of the internal clock.

Inter-Symbol Interference (ISI) is a form of distortion wherein one symbol interferes with other symbols. ISI is usually caused by channel dispersion, reflection, and/or the inherent non-linear frequency response of a channel causing successive symbols to blur together. ISI causes loss to both the voltage and timing margins of received RX signals; due to channel bandwidth, at each signal transition, the previous bit sequence shifts the RX signal amplitude and changes the relative timing when the signal crosses the voltage reference (Vref). This timing deviation is specific to a particular data sequence and is referred herein as data-dependent jitter (DDJ). As described below, in some embodiments of the disclosure, the timing margin loss caused by ISI is recouped by adjusting the sampling time depending on the previous bit sequence by adjusting the received clock signal via circuit 122, or equivalently delaying/advancing the data path dynamically via circuit 121. In other embodiments of the disclosure, the transmit time of data signal 101 is adjusted via circuit 111 depending on the transmitted bit sequence. In other words, embodiments of the disclosure describe DDJ compensation techniques for recouping the additional data eye margins implemented in RX components 120 or TX components 110.

Figure 2:
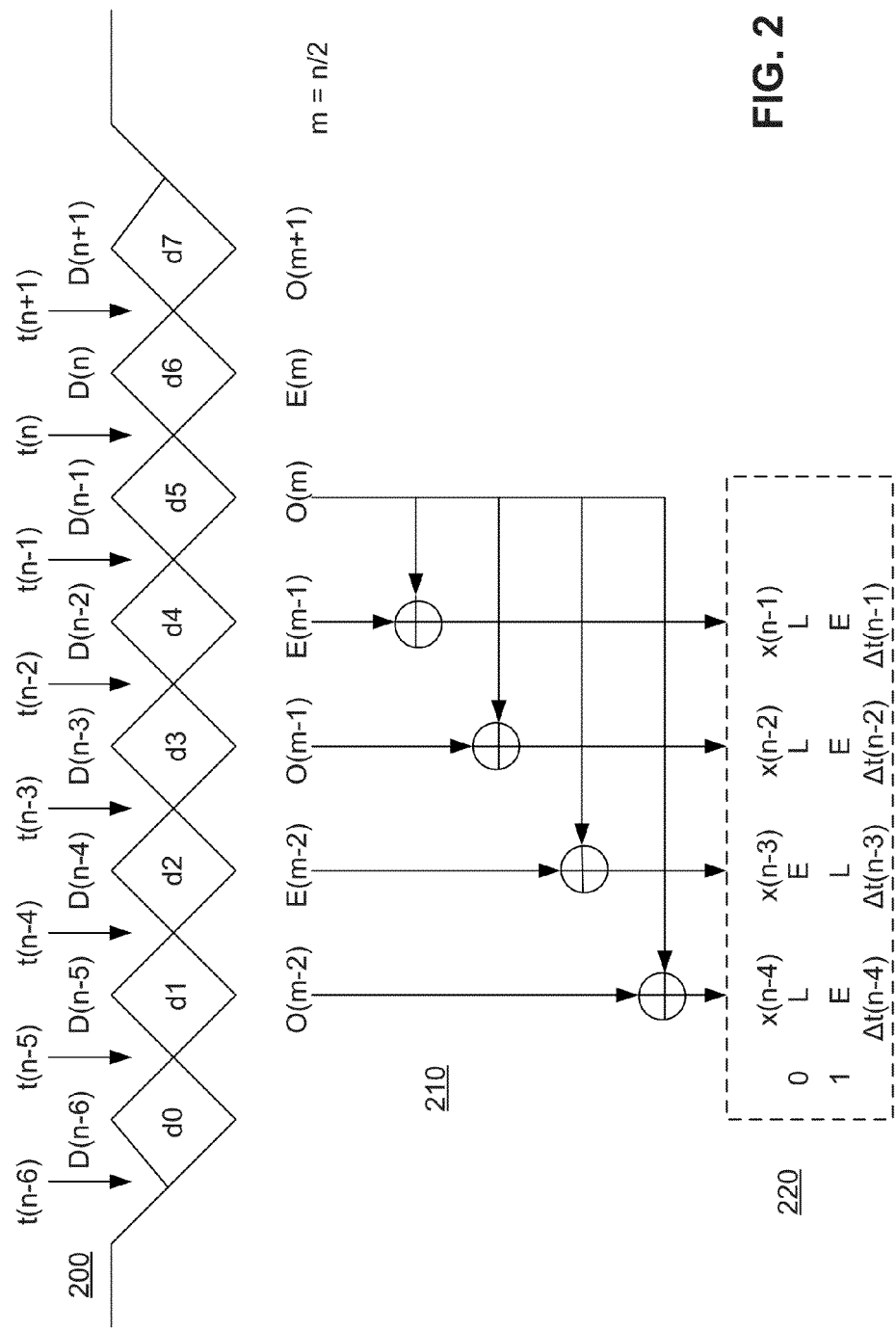
FIG. 2 illustrates data dependent jitter compensation for exemplary reception data according to an embodiment of the disclosure.

FIG. 2 illustrates DDJ compensation for exemplary RX data 200 according to an embodiment of the disclosure. In this embodiment, data signal 200 is shown to comprise an 8-bit data stream, and some of these bits are input into XOR logic 210 to generate logic table 220 as described below.

The present data bit transition (for the following operations described below) is shown as t(n); the arrival time of data transition may be predicted and compensated according to the following equation:

$$t(n)=n \cdot T\_UI+x(n-1) \cdot \Delta t(n-1)+x(n-2) \cdot \Delta t(n-2) \ldots +x(n-k) \cdot \Delta t(n-k)$$

wherein n·T_UI is the ideal sampling position for bit n, x(n−k) is the output of XOR logic 210, either interpreted as a −1 or +1 for each data transition (described in further detail below), and Δt is a channel dependent time shift/correction value which may be determined, for example, by executing a software or firmware training process.

In other words, the total timing error experienced by the t(n) is a summation of impacts due to all of the previous bits, which is found via XOR logic 210 and weighted by a Δt value—i.e., a timing shift due to two bit values. Note that in this example, Δt for each bit value may be positive or negative. Early or late timing correction on the current data is performed to compensate for this total timing error.

In this figure, the current bit is D(n) (shown to be value d6), and is also referred to as E(m), wherein m=n/2 and n is assumed to be an even number; the previous bit is D(n−1) (shown to be value d5), as is also referred to as O(m) (i.e., "even" and "odd" data bits). Furthermore, bit D(n−2) is (shown to be value d4) is E(m−1), bit D(n−3) (shown to be value d3) is O(m−1), bit D(n−4) (shown to be value d2) is E(m−2), and bit D(n−5) (shown to be value d1) is O(m−2).

The output of XOR logic 210 determines if a timing impact (Δt) is late or early, which determines the polarity (i.e., −/+ sign) for each Δt. In the description below, the output x of an XOR operation is interpreted as a −1/+1 value rather than 0/1; in other words, a '0' is interpreted as negative polarity (−1) and the '1' is interpreted as positive polarity (+1).

In this embodiment, the output of XOR logic 210 is as follows. x(n−1)=D(n−1) XOR D(n−2). If the output of this logic operation is '0', the timing impact for this data (Δt(n−1)) impacts transition D(n) late; if the output of this logic operation is '1', the timing impact for this data (Δt(n−1)) impacts transition D(n) early. This XOR operation represents the fixed tap described below—i.e., fixed to determine the timing impact of the two bits previous to D(n).

The remaining XOR operations are for the floating tap described below, which may determine the timing impact of any bits previous to D(n). x(n−2)=D(n−1) XOR D(n−3). If the output of this logic operation is '0', the timing impact for this data (Δt(n−2)) impacts transition D(n) late; if the output of this logic operation is '1', the timing impact for this data (Δt(n−2)) impacts transition D(n) early. x(n−3)=D(n−1) XOR D(n−4). If the output of this logic operation is '0', the timing impact for this data (Δt(n−3)) impacts transition D(n) early; if the output of this logic operation is '1', the timing impact for this data (Δt(n−3)) impacts transition D(n) late. x(n−4)=D(n−1) XOR D(n−4). If the output of this logic operation is '0', the timing impact for this data (Δt(n−4)) impacts transition D(n) late; if the output of this logic operation is '1', the timing impact for this data (Δt(n−4)) impacts transition D(n) early.

Logic table 220 illustrates the above described output of logic 210 for various data values. D(n−2) XOR D(n−1)=1 indicates D(n−1) made a transition; in other words, d5≠d4. If D(n) incurs another transition, D(n) switches back to the same value as D(n−2); in other words, d6=d4, and the data values for d6-d4 would be '101' or '010'.

Channel memory of the D(n−2) voltage (i.e., due to ISI) helps this transition to switch over the threshold voltage level earlier, hence this transition edge happens earlier with respect to the received clock signal when D(n−1) XOR D(n−2)=1. Therefore, embodiments of the disclosure may use an earlier clock to sample D(n), or put a delay on the data path. If D(n) does not incur a transition—i.e., d(6)=d(5), the decision to sample early does not degrade margin.

D(n−2) XOR D(n−1)=0 indicates D(n−1)=D(n−2); in other words, d5=d4. If D(n) incurs a transition, it switches to the opposite value as D(n−2); in other words, d6≠d4, and the data values for d6-d4 would be '100' and '011'. This transition may be late since channel memory of D(n−2) opposes it by postponing threshold crossing time, hence the transition edge happens late. Therefore, embodiments may use the late clock to sample D(n). The decision to sample late does not affect the margin of next bit D(n+1), as the D(n+1) sampling decision is calculated based on newer information—i.e., D(n−1) XOR D(n). The process may be iterative for all data receptions.

Furthermore, each of the earlier memories in the channel, such as the memories for bits D(n−3), D(n−4) and D(n−5) (i.e., O(m−1), E(m−2) and O(m−2)), also impact the timing of current bit transition D(n) (i.e., E(m)). For example, when one of the earlier bits D(n−k)=0, its residue in the channel may slow down the current rising edge transition, although to a lesser extent vs. more recent bits.

Logic 210 illustrates the same XOR operation applies to these earlier bits, D(n−k) XOR D(n−1), and logic table 220 indicates the early or late impact due to D(n−k). At current bit transition time, if channel memory of an earlier bit D(n−k)=0 is in the opposite polarity due to reflection, then it may speed-up the current rising edge transition. So, for earlier bits, embodiments of the disclosure may utilize polarity control for the early or late adjustment, which depends on the channel characteristic. Note that logic 210 illustrates analyzing earlier bits D(n−3), D(n−4) and D(n−5); other embodiments may analyze any different and/or any different number of earlier bits.

Figure 3:
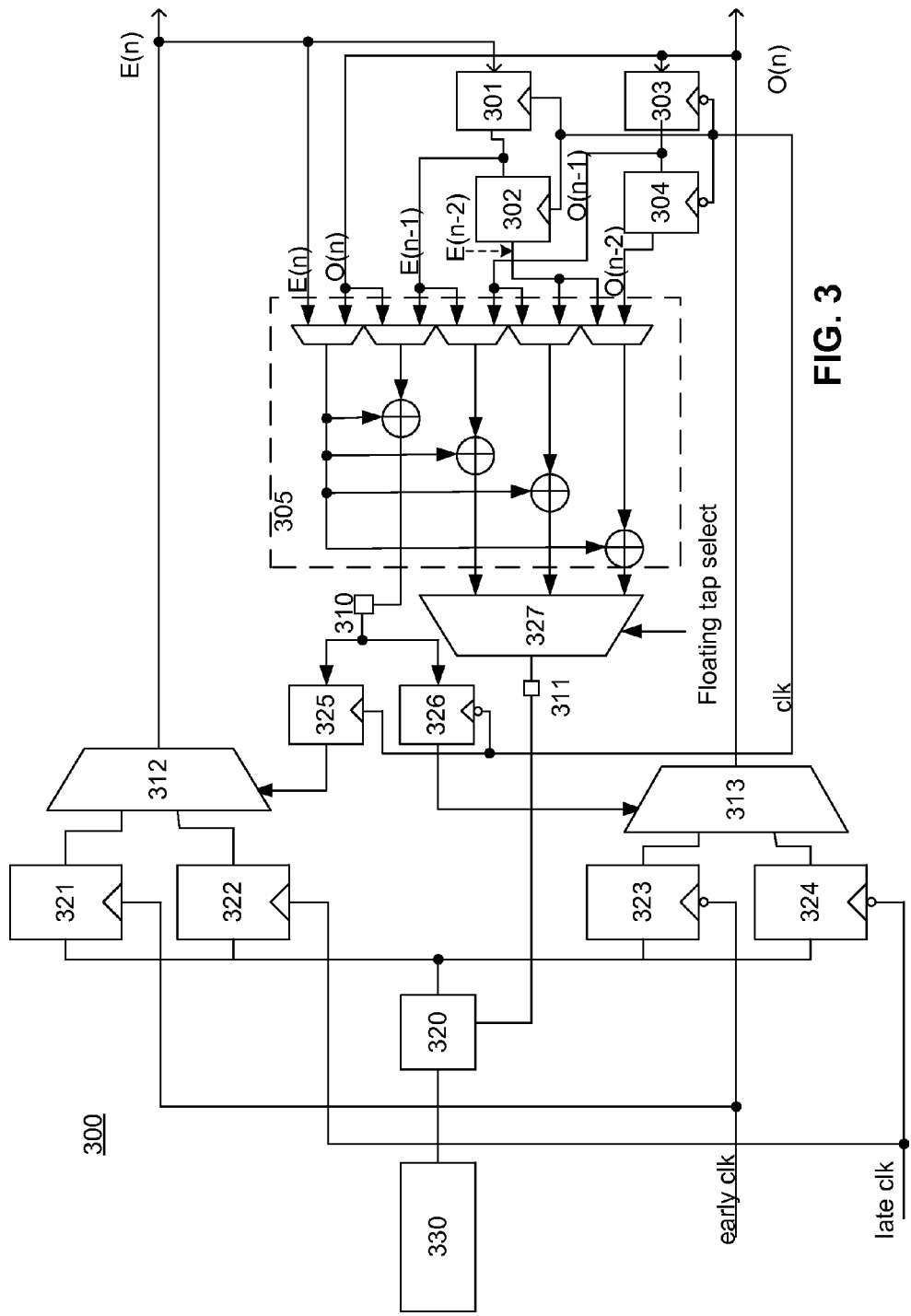
FIG. 3 is an illustration of a circuit to provide data dependent jitter compensation for a high speed I/O receiver according to an embodiment of the disclosure.

FIG. 3 is an illustration of a circuit 300 to provide DDJ compensation for a high speed I/O receiver to an embodiment of the disclosure. Circuit 300 is shown to include flip-flops 301-304 and 321-326, muxes 307, 312 and 313, XOR logic 305, polarity control 320 and delay matching circuit 330.

Circuit 300 is shown to include staggered storage circuits (e.g., latches, flip-flops) 301 and 302 to capture the values for even bits, and storage circuits 303 and 304 to capture the values for odd bits. These captured values are used to identify specific data transitions via XOR logic 305. In this embodiment, XOR logic 305 is equivalent to logic 210 of FIG. 2.

As described here, embodiments of the disclosure improve the timing margins for high speed I/O interfaces by cancelling the deterministic timing errors caused by ISI and reflections. In this embodiment, circuit 300 includes two different taps (i.e., samplers): tap 310 sampling the previous two bit values for cancelling ISI-induced timing errors; and tap 311 sampling any of previous bits E(m−1)–O(m−2) to cancel reflection-induced timing errors due to these past bits. As tap 310 is used to always sample the previous two bit values, it may be referred to here as a fixed tap; as tap 311 is used to sample several combinations of the previous bits, it may be referred to here as a floating tap.

The results of XOR logic 305 in this example are equivalent to logic table 220 of FIG. 2, and thus the result of fixed tap 310 determines, via flip-flop 325 used as selection control for mux 312, whether early strobed data 321 or late strobed data 322 is used for even bits, and determines, via flip-flop 326 used as selection control for mux 313, whether early strobed data 323 or late strobed data 324 is used for odd bits.

Floating tap select for mux 307 is used to select which XOR output from XOR logic 305 (i.e., the XOR operations for previous bit values other than the ones used for fixed tap 310) is used. The results for floating tap 311 determine whether delay matching circuit 330 advances or delays the received data signal via polarity control 320.

Channels that have longer latency ISI (i.e., reflections) may exhibit the opposite of the above described early/late timing errors, since reflection can be in the opposite polarity. Floating taps in the above described embodiment may utilize polarity control to essentially reverse the mapping between the early/late timing effect (obtained via training) to the corresponding XOR operation.

Thus, operation of XOR logic 305 detects the impact of channel memory on the timing of the current bit transition. This channel memory either opposes or assists the data signal transition, making its timing early or late, and may be decomposed into the impact of each previous bit. As discussed with respect to FIG. 2, the impact of previous bit D(n−2) on the current bit D(n) in the case of a low pass channel is expressed as the output of an XOR operation, and this maps to late or early timing adjustment respectively. This relationship from earlier bits detected by floating tap 311 may be flipped (via polarity control 320) when examining the impacts of D(n−3), D(n−4), etc. as the reflection may change the polarity of channel memory at the time current bit transitions. Therefore, in some embodiments, the early or late impact of each previous bit is predetermined—e.g., found via firmware or software training Once the channel and operation speed is known, impact of each previous bit is deterministic. Summation of all the previous bits' impact is the total timing error of current bit transition.

In some embodiments of the disclosure, as opposed to implementing solutions in RX components, the transmit time of a data signal is altered depending on the transmitted bit sequence—i.e., ISI-induced DDJ is equalized/minimized at the transmitter to compensate for the expected timing impact of a data sequence at the receiver.

Embodiments of the disclosure utilize the variation of signal propagation along a channel that results from the signal's frequency content. Low frequency data transitions, (e.g., 'xx001, 'xx110) propagate slower than high frequency data transitions, (e.g., 'xx101, 'xx010). The low frequency transitions, as a result, contribute to the squeezing (i.e., leading) of the leading edge of the data signal eye at the receiver. This DDJ-based eye margin loss may be recouped by adjusting the transmit time depending on the previous bit sequence, or equivalently, delay/advance the data path dynamically.

Figure 4:
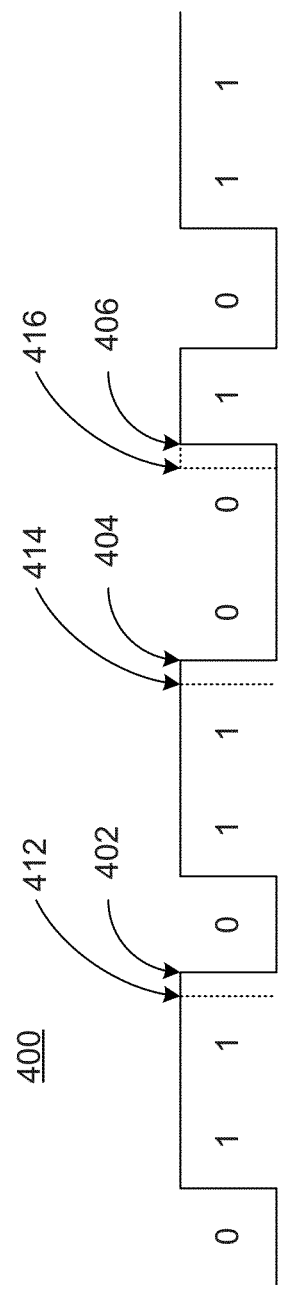
FIG. 4 is an illustration of transmission adjustments of exemplary transmitted data according to an embodiment of the disclosure.

FIG. 4 is an illustration of transmission adjustments of exemplary transmitted data 400 according to an embodiment of the disclosure. In this embodiment, data signal 400 includes three low frequency data transitions: transition 402 (shown as transitioning from previous signal value '011), transition 404 (shown as transitioning from previous signal value '011) and transition 406 (shown as transitioning from previous signal value '100), and corresponding adjusted transitions 412, 414 and 416. As discussed here, low frequency data transitions, (e.g., 'xx001, 'xx110) propagate slower than their high frequency counterparts.

As shown in this illustration, at the transmitter, the transition edges at known low frequency transitions 402, 404 and 406 are pulled in—as shown by adjusted transitions 412, 414 and 416, respectively. These adjusted transition pulse widths are in essence, taken from width from the non-stressing two consecutive 1's (for transitions 402 and 404) or 0's (for transition 406) that precede them. Thus, DDJ that reverses the channel ISI effect is injected into the signal at transmitter side, such that when the signal arrives at the receiver side, DDJ is equalized or minimized.

Figure 5:
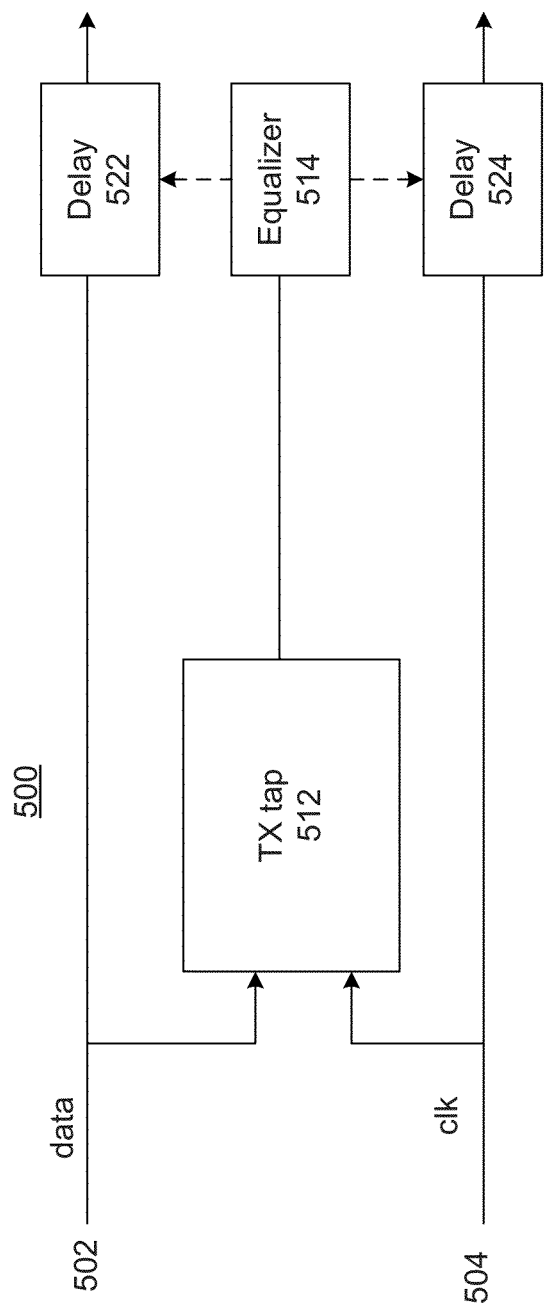
FIG. 5 is an illustration of a circuit to provide data dependent jitter compensation for a high speed I/O transmitter to an embodiment of the disclosure.

FIG. 5 is an illustration of a circuit 500 to provide DDJ compensation for a high speed I/O transmitter according to an embodiment of the disclosure. Circuit 500 is shown to receive data signal 502 and clock signal 504, and is shown to include TX tap 512, equalizer 514, and delay circuits 522 and 524.

In this embodiment, circuit 500 may be implemented in a serial or parallel bus interface, and is shown to include transmission data tap 512 to analyze the current and previous bit values to be transmitted via data bus path 502; these captured bit values are used to identify low-frequency and high frequency data transitions as described above. Transmission data tap 512 may sample the previous two bits, or may comprise more than two taps to identify any previous number of bits.

Equalizer 514 analyzes data from transmission data tap 512 and inserts a time delay on either data path 502 or clock path 504 via delay circuits 522 and 524, respectively. In some embodiments, such as DDR transmission embodiments, two delay circuits may be used for even and odd data paths.

Figure 6:
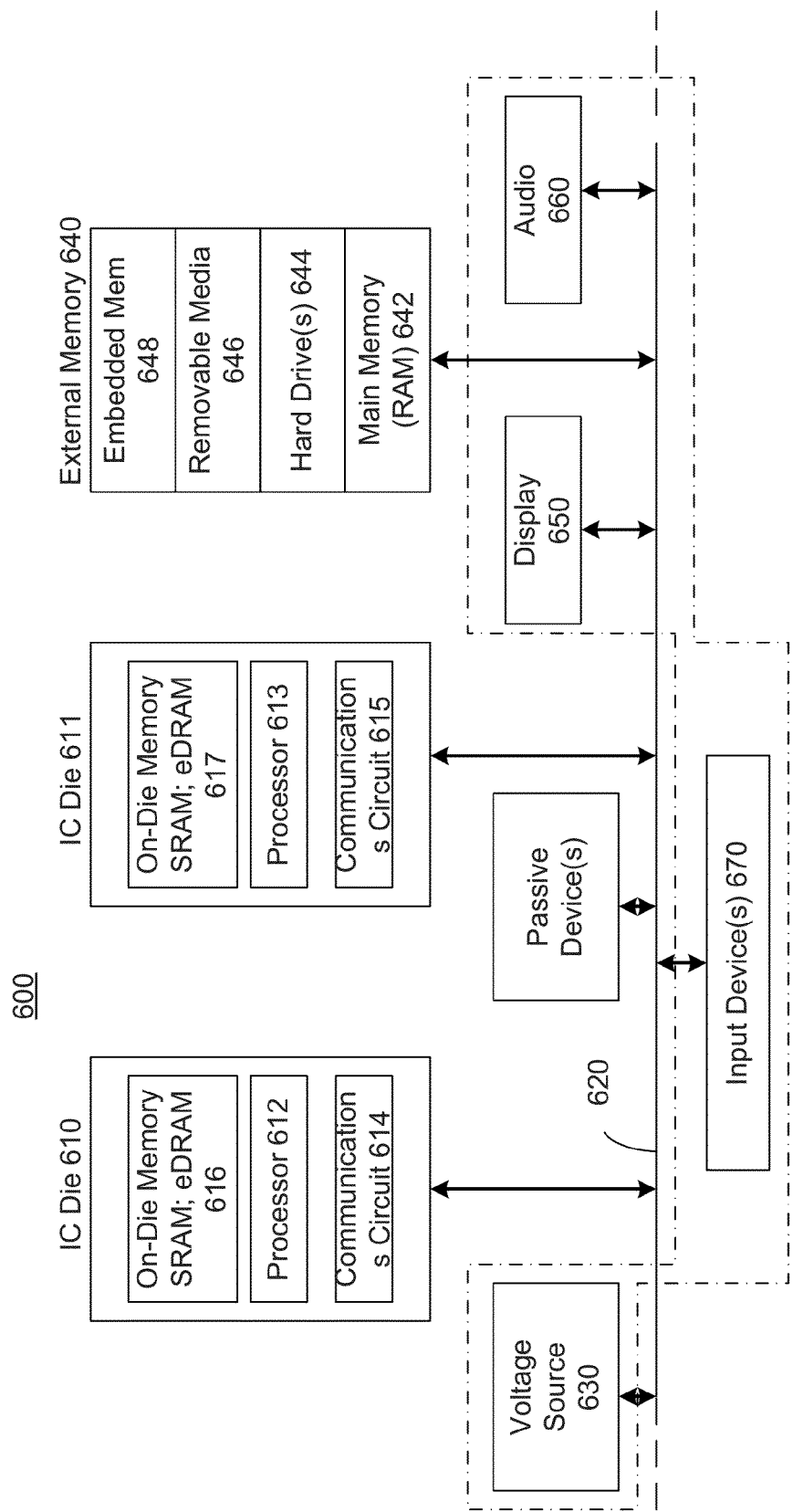
FIG. 6 is an illustration of a computer system to utilize an embodiment of the disclosure.

FIG. 6 is an illustration of a computer system 600 to utilize an embodiment of the disclosure. Computer system 600 (also referred to as the electronic system 600) as depicted may comprise components utilizing any of the I/O interfaces with TX/RX adjustment circuits described above. Computer system 600 may be a mobile device such as a netbook computer. Computer system 600 may be a mobile device such as a wireless smart phone. Computer system 600 may be a desktop computer. The computer system 600 may be a hand-held reader. Computer system 600 may be a wearable computing device.

In an embodiment, system 600 is a computer system that includes system bus 620 to electrically couple the various components of the electronic system. System bus 620 is a single bus or any combination of busses according to various embodiments. System 600 includes voltage source 630 that provides power to integrated circuit 610. In some embodiments, the source 630 supplies current to integrated circuit 610 through system bus 620.

Integrated circuit 610 is electrically coupled to system bus 620 and includes any circuit, or combination of circuits according to an embodiment. In an embodiment, integrated circuit 610 includes processor 612 that can be of any type. As used herein, processor 612 may mean any type of circuit such as, but not limited to, a microprocessor, a microcontroller, a graphics processor, a digital signal processor, or another processor. In an embodiment, SRAM embodiments are found in memory caches of the processor. Other types of circuits that can be included in integrated circuit 610 are a custom circuit or an application-specific integrated circuit (ASIC), such as communications circuit 614 for use in wireless devices such as cellular telephones, smart phones, pagers, portable computers, two-way radios, and similar electronic systems. In an embodiment, processor 610 includes on-die memory 616 such as static random-access memory (SRAM). In an embodiment, processor 610 includes embedded on-die memory 616 such as embedded dynamic random-access memory (eDRAM).

In an embodiment, integrated circuit 610 is complemented with subsequent integrated circuit 611. Useful embodiments include dual processor 613 and dual communications circuit 615 and dual on-die memory 617 such as SRAM. In an embodiment, dual integrated circuit 611 includes embedded on-die memory 617 such as eDRAM.

In an embodiment, electronic system 600 also includes an external memory 640 that in turn may include one or more memory elements suitable to the particular application, such as main memory 642 in the form of RAM, one or more hard drives 644, and/or one or more drives that handle removable media 646, such as diskettes, compact disks (CDs), digital variable disks (DVDs), flash memory drives, and other removable media known in the art. External memory 640 may also be embedded memory 648 such as the first die in an embedded TSV die stack, according to an embodiment.

In an embodiment, electronic system 600 also includes display device 650 and audio output 660. In an embodiment, electronic system 600 includes an input device such as controller 670 that may be a keyboard, mouse, trackball, game controller, microphone, voice-recognition device, or any other input device that inputs information into electronic system 600. In an embodiment, input device 670 is a camera. In an embodiment, input device 670 is a digital sound recorder. In an embodiment, input device 670 is a camera and a digital sound recorder.

As shown herein, integrated circuit 610 may be implemented in a number of different embodiments that utilize the I/O interfaces with TX/RX adjustment circuits according to any of the several disclosed embodiments and their equivalents, an electronic system, a computer system, one or more methods of fabricating an integrated circuit, and one or more methods of fabricating an electronic assembly that includes a semiconductor package having I/O interfaces with TX/RX adjustment circuits according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed semiconductor package having transistors to utilize any of the previously discussed I/O interfaces with TX/RX adjustment circuits and their equivalents. A foundation substrate may be included, as represented by the dashed line of FIG. 6. Passive devices may also be included, as is also depicted in FIG. 6.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the disclosure but to illustrate it. The scope of the disclosure is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, apparatuses may include a data receiver to receive a data signal, a clock/strobe receiver to receive a clock/strobe signal, a data signal tap/register to capture, in response to an identified data transition in the data signal, a first and a second bit value of the data signal prior to the identified data transition, and an equalization circuit to delay reception of at least one of the data signal or the clock/strobe signal at a time of the data transition based, at least in part, on the first and second bit values and the identified data transition.

The equalization circuit may further determine the received data signal leads the received clock/strobe signal in response to the first bit value differing from the second bit value, and equalize the received data signal or the received clock/strobe signal by either delaying the reception of the data signal or selecting a second clock/strobe signal for sampling the data signal.

The equalization circuit may further determine the received data signal lags the received clock/strobe signal in response to the first bit value matching the second bit value, and equalize the received clock/strobe signal by delaying the reception of the clock/strobe signal.

Apparatuses may further include a floating data signal tap/register to capture, in response to the identified data transition in the data signal, a third and a fourth bit value of the data signal prior to the identified data transition. In these apparatuses, the equalization circuit may delay or advance reception of the data signal further based, at least in part, on the third and fourth bit values and the identified data transition. The data receiver and the clock/strobe receiver may be included in a parallel bus interface, or a serial bus interface.

Apparatuses may include a data transmitter to transmit a data signal, a clock/strobe transmitter to transmit a clock/strobe signal, a data signal tap/register to capture, in response to an identified data transition to be transmitted in the data signal, a first and a second bit value of the data signal prior to the identified data transition, and an equalization circuit to adjust a timing of the identified data transition to be transmitted based, at least in part, on the first and second bit values and the identified data transition.

The low-frequency data transition may comprise the first and second bit values matching and both differing from the identified data transition, and the equalization circuit may adjust the timing of the identified data transition to be transmitted earlier in response to detecting the low frequency data transition. The high-frequency data transition may comprise the first and second bit values differing and the second bit value matching the identified data transition, and the equalization circuit may adjust the timing of the identified data transition to be transmitted later in response to detecting the high-frequency data transition.

Apparatuses may further include one or more additional data signal taps/registers to capture, in response to the identified data transition to be transmitted in the data signal, one or more additional bit values of the data signal prior to the identified data transition.

The equalization circuit may adjust the timing of the identified data transition to be transmitted further based, at least in part, on the one or more additional bit values. The data transmitter and the clock/strobe transmitter may be included in a parallel bus interface or a serial bus interface.

Systems may comprise a first and a second device, a system bus communicatively coupling the first and the second device, and a wireless interface for allowing at least one of the first or the second device to communicate with another device. At least one of the first or the second device may include an input/output (I/O) interface comprising a data receiver to receive a data signal, a clock/strobe receiver to receive a clock/strobe signal, a data signal tap/register to capture, in response to an identified data transition in the data signal, a first and a second bit value of the data signal prior to the identified data transition, and an equalization circuit to delay reception of at least one of the data signal or the clock/strobe signal at a time of the data transition based, at least in part, on the first and second bit values and the identified data transition.

The equalization circuit of the I/O interface may further determine the received data signal leads the received clock/strobe signal in response to the first bit value differing from the second bit value, and equalize the received data signal or the received clock/strobe signal by either delaying the reception of the data signal or selecting a second clock/strobe signal for sampling the data signal.

The equalization circuit of the I/O interface may further determine the received data signal lags the received clock/strobe signal in response to the first bit value matching the second bit value, and equalize the received clock/strobe signal by delaying the reception of the clock/strobe signal.

The I/O interface may further comprise a floating data signal tap/register to capture a third and a fourth bit value of the data signal prior to the identified data transition, and the equalization circuit may delay or advance reception of the data signal further based, at least in part, on the third and fourth bit values and the identified data transition. The I/O interface may comprise a parallel bus interface or a serial bus interface.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a data receiver to receive a data signal;
a clock/strobe receiver to receive a clock/strobe signal;
a data signal tap/register to capture, in response to an identified data transition in the data signal, a first and a second bit values of the data signal prior to the identified data transition;
a floating data signal tap/register to capture, in response to the identified data transition in the data signal, a combination of bit values prior to the first and second bit values, wherein the first and second bit values include two bits of the data signal immediately prior to the identified data transition; and
an equalization circuit to delay reception of at least one of the data signal or the clock/strobe signal at a time of the data transition based, at least in part, on the first and second bit values and the identified data transition.

2. The apparatus of claim 1, wherein the equalization circuit is to further:
determine the received data signal leads the received clock/strobe signal in response to the first bit value differing from the second bit value; and
equalize the received data signal or the received clock/strobe signal by either delaying the reception of the data signal or selecting a second clock/strobe signal for sampling the data signal.

3. The apparatus of claim 1, wherein the equalization circuit is to further:
determine the received data signal lags the received clock/strobe signal in response to the first bit value matching the second bit value; and
equalize the received clock/strobe signal by delaying the reception of the clock/strobe signal.

4. The apparatus of claim 1,
wherein the combination of bit values include a third and a fourth bit value of the data signal prior to the identified data transition.

5. The apparatus of claim 4, wherein the equalization circuit to delay or advance reception of the data signal further based, at least in part, on the third and fourth bit values and the identified data transition.

6. The apparatus of claim 1, wherein the data receiver and the clock/strobe receiver are included in a parallel bus interface.

7. The apparatus of claim 1, wherein the data receiver and the clock/strobe receiver are included in a serial bus interface.

8. An apparatus comprising:
a data transmitter to transmit a data signal;
a clock/strobe transmitter to transmit a clock/strobe signal;
a data signal tap/register to capture, in response to an identified data transition to be transmitted in the data signal, a first and a second bit values of the data signal prior to the identified data transition;
one or more additional data signal taps/registers to capture, in response to the identified data transition in the data signal, a combination of bit values prior to the first and second bit values, wherein the first and second bit values include two bits of the data signal immediately prior to the identified data transition; and
an equalization circuit to adjust a timing of the identified data transition to be transmitted based, at least in part, on the first and second bit values and the identified data transition.

9. The apparatus of claim 8, wherein a low-frequency data transition comprises the first and second bit values matching and both differing from the identified data transition, and wherein the equalization circuit adjusts the timing of the identified data transition to be transmitted earlier in response to detecting the low frequency data transition.

10. The apparatus of claim 8, wherein a high-frequency data transition comprises the first and second bit values differing and the second bit value matching the identified data transition, and wherein the equalization circuit adjusts the timing of the identified data transition to be transmitted later in response to detecting the high-frequency data transition.

11. The apparatus of claim 8, wherein the equalization circuit to adjust the timing of the identified data transition to be transmitted further based, at least in part, on the combination of bit values.

12. The apparatus of claim 8, wherein the data transmitter and the clock/strobe transmitter are included in a parallel bus interface.

13. The apparatus of claim 8, wherein the data transmitter and the clock/strobe transmitter are included in a serial bus interface.

14. A system comprising:
a first and a second device;
a system bus communicatively coupling the first and the second device; and
a wireless interface for allowing at least one of the first or the second device to communicate with another device;
wherein at least one of the first or the second device includes an input/output (I/O) interface comprising:
a data receiver to receive a data signal;
a clock/strobe receiver to receive a clock/strobe signal;
a data signal tap/register to capture, in response to an identified data transition in the data signal, a first and a second bit values of the data signal prior to the identified data transition;
a floating data signal tap/register to capture, in response to the identified data transition in the data signal, a combination of bit values prior to the first and second bit values, wherein the first and second bit values include two bits of the data signal immediately prior to the identified data transition; and
an equalization circuit to delay reception of at least one of the data signal or the clock/strobe signal at a time of the data transition based, at least in part, on the first and second bit values and the identified data transition.

15. The system of claim 14, wherein the equalization circuit of the I/O interface is to further:
determine the received data signal leads the received clock/strobe signal in response to the first bit value differing from the second bit value; and
equalize the received data signal or the received clock/strobe signal by either delaying the reception of the data signal or selecting a second clock/strobe signal for sampling the data signal.

16. The system of claim 14, wherein the equalization circuit of the I/O interface is to further:
determine the received data signal lags the received clock/strobe signal in response to the first bit value matching the second bit value; and
equalize the received clock/strobe signal by delaying the reception of the clock/strobe signal.

17. The system of claim 14, wherein
the combination of bit values include a third and a fourth bit value of the data signal prior to the identified data transition;

wherein the equalization circuit to delay or advance reception of the data signal further based, at least in part, on the third and fourth bit values and the identified data transition.

18. An apparatus comprising:
a parallel bus interface including:
   a data transmitter to transmit a plurality of data signals; and
   a clock/strobe transmitter to transmit a clock/strobe signal;
a data signal tap/register and a floating data signal tap/register to identify a common data transition to be transmitted in at least some of the plurality of data signals, wherein the floating data signal tap/register samples a combination of bit values different from bits sampled by the data signal tap/register; and
an equalization circuit to adjust a timing of the transmission of the plurality of data signals in response to identifying the common data transition.

19. The apparatus of claim 18, wherein adjusting the timing of the transmission of the plurality of data signals in response to identifying the common data transition comprises:
performing one of early or late timing correction on the transmission of the plurality of data signals.

20. The apparatus of claim 18, wherein the parallel bus interface further includes power and ground signals.

* * * * *